United States Patent
Bankeström

(10) Patent No.: US 9,746,306 B2
(45) Date of Patent: Aug. 29, 2017

(54) DEVICE AND METHOD FOR DETERMINING A CONTACT ANGLE OF A ROLLING ELEMENT

(75) Inventor: Olle Bankeström, Västra Frölunda (SE)

(73) Assignee: AKTIEBOLAGET SKF, Gothenburg (SE)

( * ) Notice: Subject to any disclaimer, the term of this patent is extended or adjusted under 35 U.S.C. 154(b) by 635 days.

(21) Appl. No.: 14/115,417

(22) PCT Filed: May 3, 2012

(86) PCT No.: PCT/SE2012/000063
§ 371 (c)(1),
(2), (4) Date: Nov. 4, 2013

(87) PCT Pub. No.: WO2013/043095
PCT Pub. Date: Mar. 28, 2013

(65) Prior Publication Data
US 2014/0060183 A1    Mar. 6, 2014

(30) Foreign Application Priority Data

May 4, 2011    (SE) ........................... 1100346

(51) Int. Cl.
| | |
|---|---|
| G01P 15/00 | (2006.01) |
| G01B 5/24 | (2006.01) |
| G01M 13/04 | (2006.01) |
| G01P 3/481 | (2006.01) |
| F16C 19/16 | (2006.01) |
| F16C 19/52 | (2006.01) |

(52) U.S. Cl.
CPC .............. *G01B 5/24* (2013.01); *F16C 19/166* (2013.01); *F16C 19/52* (2013.01); *G01M 13/04* (2013.01); *G01P 3/481* (2013.01); *F16C 2233/00* (2013.01); *F16C 2240/34* (2013.01)

(58) Field of Classification Search
USPC ............ 73/488, 865.9; 324/178; 377/20, 23; 384/448
See application file for complete search history.

(56) References Cited

U.S. PATENT DOCUMENTS

| | | | |
|---|---|---|---|
| 5,140,849 A | * | 8/1992 | Fujita ...................... F16C 19/52 73/593 |
| 5,423,218 A | | 6/1995 | Matsuzaki |
| 2002/0193195 A1 | | 12/2002 | Ishiguro et al. |
| 2003/0164050 A1 | * | 9/2003 | Chinitz ................ G01L 5/0019 73/862.49 |

(Continued)

FOREIGN PATENT DOCUMENTS

GB    2187518 A * 9/1987 ............ G01M 13/04

*Primary Examiner* — Lisa Caputo
*Assistant Examiner* — Tarun Sinha
(74) *Attorney, Agent, or Firm* — Bryan Peckjian; SKF USA Inc. Patent Dept.

(57) ABSTRACT

Method for determining the contact angle ($\alpha$) of a rolling element bearing (10) comprising an inner ring (12), an outer ring (14) and a plurality, P, of rolling elements (16) interposed between the inner ring (12) and the outer ring (14). The method comprises the step of determining the relative speed of P−1 or fewer of said plurality, P, of rolling elements (16) with respect to the inner ring (12) and/or the outer ring (14) and determining the contact angle ($\alpha$) of said rolling element bearing (10) therefrom.

13 Claims, 2 Drawing Sheets

(56) References Cited

U.S. PATENT DOCUMENTS

2004/0261543 A1* 12/2004 Van Leeuwen ....... F16C 19/522
 73/862.49
2006/0245677 A1* 11/2006 Kenworthy ............. F16C 19/14
 384/448
2007/0074587 A1* 4/2007 Mol ...................... G01L 5/0019
 73/862.322
2007/0277612 A1* 12/2007 Ehrfeld .................. G01K 13/08
 73/593
2011/0228261 A1 9/2011 Arciuli

* cited by examiner

DEVICE AND METHOD FOR DETERMINING A CONTACT ANGLE OF A ROLLING ELEMENT

CROSS-REFERENCE

This application is the U.S. National Stage of International Application No. PCT/SE2012/000063 filed on May 3, 2012, which claims priority to Swedish Patent Application No. SE1100346-4 filed on May 4, 2011, the contents of which are both hereby incorporated by reference in their entirety.

TECHNICAL FIELD

The present invention concerns method, device and computer program product for determining the contact angle of a rolling element bearing comprising an inner ring, an outer ring and a plurality, P, of rolling elements interposed between the inner ring and the outer ring.

BACKGROUND OF THE INVENTION

The bearing contact angle is the angle between a plane perpendicular to the bearing axis and a line extending through the points of contact of a bearing ball with the raceways of the inner and outer rings. Measurement of this angle provides an extremely good check on the general geometrical accuracy of the various components in the bearing. It has also been established in certain applications that if a bearing is to function correctly for a predetermined operational life, then the contact angle must be within closely defined limits.

In order to measure the contact angle of a bearing a small axial load may be applied to the outer ring (with the inner ring held stationary). A special gauging tool rotates the outer ring so that it completes a predetermined number of revolutions, such as 20 revolutions, and simultaneously tracks revolutions of the retainer or ball set, i.e. it counts the number of rolling elements that pass a certain point for each revolution of the outer ring. This data, the retainer rev count and the outer race rev count, together with knowledge of the dimensions of the components of the rolling element bearing may then be used to calculate the initial bearing contact angle (the bearing contact angle at zero axial load).

SUMMARY OF THE INVENTION

An object of the invention is to provide a method suitable for determining the contact angle of a rolling element bearing comprising an inner ring, an outer ring and a plurality, P, of rolling elements interposed between the inner ring and the outer ring, in an easy and reliable way.

This object is achieved by a method comprising the step of determining the relative speed of P−1 or fewer of the plurality, P, of rolling elements with respect to the inner ring and/or the outer ring and determining the contact angle of the rolling element bearing therefrom. According to an embodiment of the invention the relative speed of just one of the plurality, P, of rolling elements with respect to the inner ring and/or the outer ring is determined and the contact angle of the rolling element bearing is determined therefrom.

The orbital speed of just one or any number of rolling element bearings up to P−1 is therefore measured. All of the plurality, P, of rolling elements do not need to be used to determine the contact angle of a rolling element bearing.

According to an embodiment of the invention the method comprises the step of determining the time taken for the P−1 or fewer of the plurality, P, of rolling elements to move between a first measuring station and a second measuring station, whereby the first measuring station and the second measuring station are located around the circumference of the rolling element bearing.

According to another embodiment of the invention a first measuring station is located at an angular distance of 10-70°, preferably 10-30° from a second measuring station.

According to a further embodiment of the invention the method comprises the steps of using pulse generating means to generate a pulse when the P−1 or fewer of the plurality, P, of rolling elements pass/passes the first measuring station and/or the second measuring station, and counting the pulses to determine the time taken for the P−1 or fewer of the plurality, P, of rolling elements to move between a first measuring station and a second measuring station. Such a pulse generating means may for example be placed on the inner ring and/or the outer ring of the rolling element bearing or in any other suitable location.

According to an embodiment of the invention the method comprises the step of starting to generate pulses when the P−1 or fewer of the plurality, P, of rolling elements pass/passes the first measuring station and stopping counting pulses when the same P−1 or fewer of the plurality, P, of rolling elements pass/passes the second measuring station.

According to another embodiment of the invention the method comprises the steps of determining the relative speed of P−1 or fewer of the plurality, P, of rolling elements with respect to the inner ring and/or the outer ring and the contact angle of the rolling element bearing as the outer ring or the inner ring rotates through less than one revolution. A rolling element does not therefore need to be rotated through a plurality of revolutions in order to determine its contact angle. The contact angle may namely be determined by only rotating the rolling element bearing through part of a revolution. It has been found that such a method will still have a high reliability and accuracy. In the prior art, an inner or outer ring must be rotated through several revolutions. An advantage with the method according to the present invention is that the contact angle of a rolling element bearing can be determined by only rotating the bearing a few degrees.

The uncertainty in rolling element passage detection using a method according to the present invention has been found to be about 1 mm when the distance between the first measuring station and the second measuring station is about 330 mm for a bearing having a diameter of about 2 m. This means an uncertainty of about 0.3%.

The method according to the present invention may be used to determine the contact angle of any rolling element bearing, such as a ball bearing, a four-point contact ball bearing, a roller bearing, a needle bearing, a spherical roller bearing, intended for use in any application, such as in automotive, wind, marine or metal producing.

The present invention also concerns a computer program product that comprises a computer program containing computer program code means arranged to cause a computer or a processor to execute the steps of a method according to any of the embodiments of the invention, stored on a computer-readable medium or a carrier wave.

The present invention further concerns a device for determining the contact angle of a rolling element bearing comprising an inner ring, an outer ring and a plurality, P, of rolling elements interposed between the inner ring and the outer ring. The device is arranged to determine the relative speed of P−1 or fewer of the plurality, P, of rolling elements with respect to the inner ring and/or the outer ring and determine the contact angle of the rolling element bearing therefrom.

According to an embodiment of the invention the device is arranged to determine the relative speed of just one of the plurality, P, of rolling elements with respect to the inner ring and/or the outer ring and determine the contact angle of the rolling element bearing therefrom.

According to another embodiment of the invention the device comprises a first measuring station and a second measuring station, and it is arranged to determine the time taken for the P−1 or fewer of the plurality, P, of rolling elements to move between the first measuring station and the second measuring station, whereby the first measuring station and the second measuring station are located around the circumference of the rolling element bearing.

According to a further embodiment of the invention a first measuring station is located at an angular distance of 10-70°, preferably 10-30° from a second measuring station.

According to an embodiment of the invention the device comprises a pulse generating means arranged to generate a pulse when the P−1 or fewer of the plurality, P, of rolling elements pass/passes the first measuring station and/or the second measuring station, whereby the device is arranged to count the pulses to determine the time taken for the P−1 or fewer of the plurality, P, of rolling elements to move between a first measuring station and a second measuring station.

According to another embodiment of the invention the pulse generating means is arranged to start generating pulses when the P−1 or fewer of the plurality, P, of rolling elements pass/passes the first measuring station, and to stop counting pulses when the P−1 or fewer of the plurality, P, of rolling elements pass/passes the second measuring station.

According to an embodiment of the invention the device is arranged to determine the relative speed of P−1 or fewer of the plurality, P, of rolling elements with respect to the inner ring and/or the outer ring and the contact angle of the rolling element bearing as the outer ring or the inner ring rotate through less than one revolution.

The device may be used to determine the contact angle of any rolling element bearing, such as a ball bearing, a four-point contact ball bearing, a roller bearing, a needle bearing, a spherical roller bearing, intended for use in any application, such as in automotive wind, marine or metal producing.

A device or method according to the present invention may be used to test rolling element bearings after their manufacture, and/or to monitor a rolling element bearing when it is in use. For example, the condition of a rolling element bearing in a turbine may be monitored using a device or method according to an embodiment of the invention.

BRIEF DESCRIPTION OF THE DRAWINGS

The present invention will hereinafter be further explained by means of non-limiting examples with reference to the appended schematic figures where.

It should be noted that the drawings have not been drawn to scale and that the dimensions of certain features have been exaggerated for the sake of clarity.

DETAILED DESCRIPTION OF EMBODIMENTS

Figure 1:
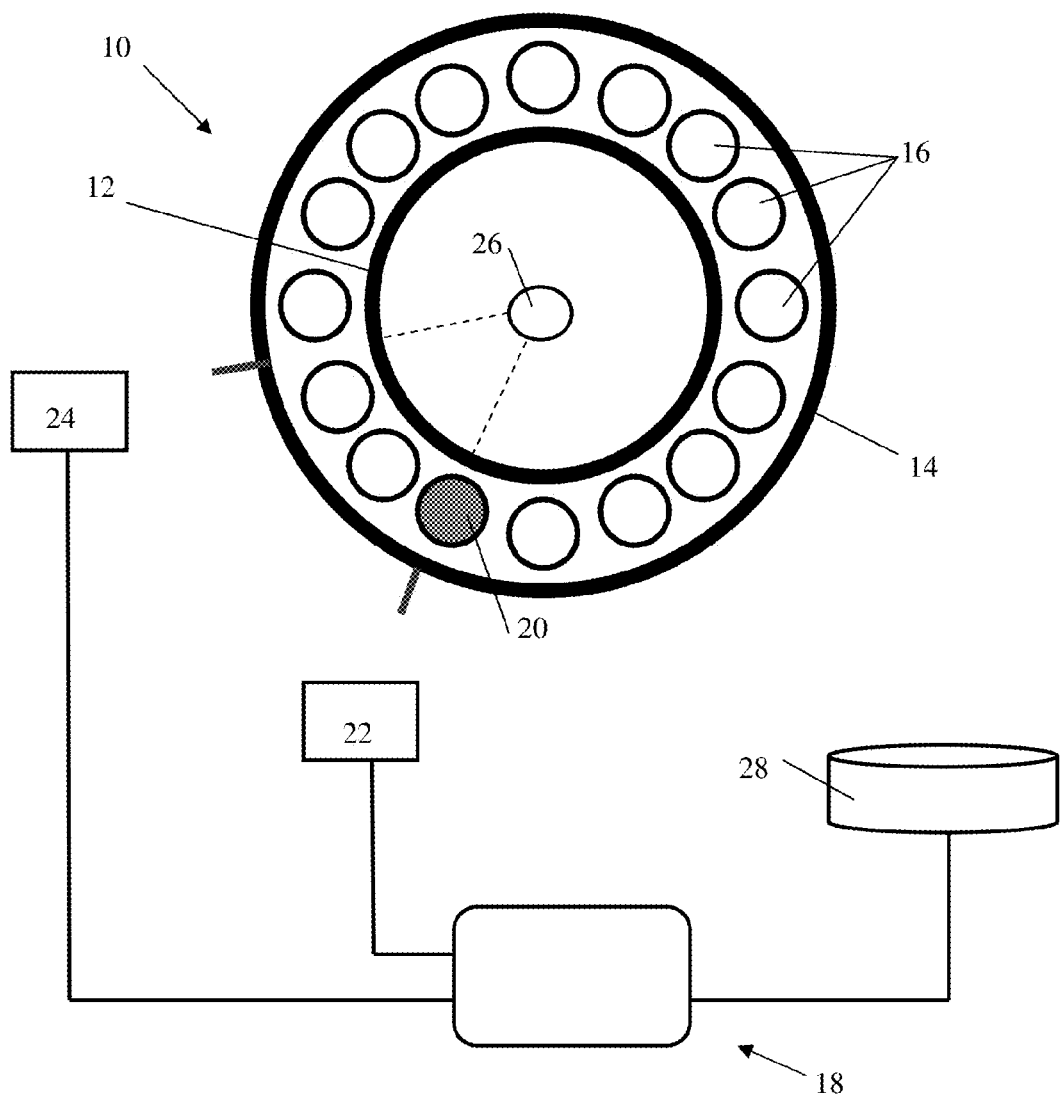
FIG. 1 shows a device according to an embodiment of the invention.

FIG. 1 shows an example of a rolling element bearing 10 that may range in size from 10 mm diameter to a few meters diameter and have a load-carrying capacity from a few tens of grams to many thousands of tonnes. The bearing 10 may namely be of any size and have any load-carrying capacity. The bearing 10 has an inner ring 12 and an outer ring 14 and a plurality of rolling elements 16 interposed between the inner ring 12 and the outer ring 14.

FIG. 1 also shows a device 18 for determining the contact angle of the rolling element bearing 10. The device 18 is arranged to determine the relative speed of one rolling element 20 of the plurality of rolling elements 16 with respect to the inner ring 12 and/or the outer ring 14 and determine the contact angle of the rolling element bearing 10 therefrom.

The device 18 comprises a first measuring station 22 and a second measuring station 24, and it is arranged to determine the time taken for the rolling element 20 to move between the first measuring station 22 and the second measuring station 24 which are located around the circumference of the rolling element bearing 10. The first measuring station 22 may be located at an angular distance of 10-70°, preferably 10-30° from the second measuring station 24.

The device 18 comprises a pulse generating means 26, such as an encoder, located on the inner ring 12 for example, and arranged to generate a pulse when the rolling element 20 passes the first measuring station 22. The device 18 is arranged to count the pulses to determine the time taken for the rolling element 22 to move between the first measuring station 22 and a second measuring station 24. The device 18 may be arranged to stop counting pulses when that same rolling element 20 passes the second measuring station 24. For example, in the illustrated embodiment, pulses will not be counted after three rolling elements have passed the second measuring station 24 since the rolling element 20 whose relative speed with respect to the inner ring 12 and/or the outer ring 14 is being determined is the third rolling element that will pass the second measuring station 24.

The device 18 may thereby determine the relative speed of the rolling element 20 with respect to the inner ring 12 and/or the outer ring 14 and the contact angle of the rolling element bearing 10 as the outer ring 14 or the inner ring 12 rotates through less than one revolution.

It has been found that in order to achieve an error of just 0.3%, about 300 pulses need to be generated during the measurement method if a rolling element bearing 10 is rotated through 40°. A pulse generating means 26, such as an encoder, which generates 2000-3000 pulses/revolution, such as 2700 pulses/revolution, is therefore preferable.

The device 18 in the illustrated embodiment also comprises a memory means 28 to store measured data and/or determined relative speeds and/or contact angles. It should be noted that the components of the device according to the present invention may be connected by any wired or wireless means and that the determination of relative speeds and/or contact angles may take place remotely from the rolling element bearing 10.

The device 18 in the illustrated embodiment comprises only one first measuring station 22 and one second measuring station 24. A device 18 may however comprise any number of such measuring stations 22, 24 and any number of rolling elements 20 may be used to determine their relative speed with respect to the inner ring 12 or the outer ring 14. For example, 5 or 10 rolling elements 20 may be used to determine their relative speed with respect to the inner ring 12 and/or the outer ring 14 and an average may be calculated therefrom.

Even though the illustrated embodiment shows a ball bearing, the device 18 according to the present invention may be used to determine the contact angle of any rolling element bearing.

Figure 2:
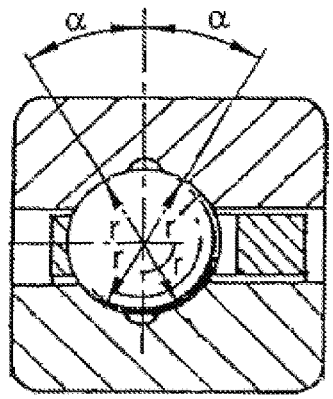
FIG. 2 shows the contact angle of a four point contact bearing.

FIG. 2 shows the contact angle, α, of a four-point contact bearing.

Figure 3:
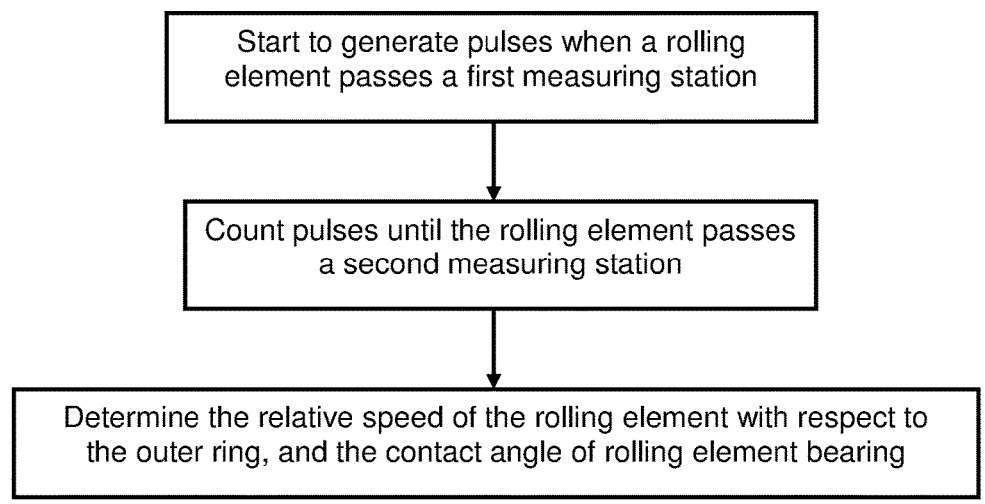
FIG. 3 shows the steps of a method according to an embodiment of the invention.

FIG. 3 shows the steps of a method according to an embodiment of the invention. The method comprises the steps of determining the relative speed of P−1 or fewer of the plurality, P, of rolling elements 16 of a rolling element bearing 10 with respect to its inner ring 12 and/or outer ring 14 and determining the contact angle, α, of the rolling element bearing therefrom. The method may be carried out while a rolling element bearing 10 is in use, or when it is rotating. Otherwise, the inner or outer ring may be made to rotate.

Pulses are generated so that the time taken for the P−1 or fewer of the plurality, P, of rolling elements 16 to move between a first measuring station 22 and a second measuring station 24 can be determined, whereby the first measuring station 22 and the second measuring station 24 are located around the circumference of the rolling element bearing 10, for example the first measuring station 22 is located at an angular distance of 10-70°, preferably 10-30° from the second measuring station 24.

Pulses are generated when the P−1 or fewer of the plurality, P, of rolling elements pass/passes the first measuring station 22 and are counted until the P−1 or fewer of the plurality, P, of rolling elements 16 pass/passes the second measuring station 22. The relative speed of the P−1 or fewer of the plurality, P, of rolling elements 16 with respect to the inner ring 12 and/or the outer ring 14 and the contact angle, α, of the rolling element bearing 10 may then be determined.

Further modifications of the invention within the scope of the claims would be apparent to a skilled person. For example, it is possible to determine the relative speed of P−1 or fewer of the plurality, P, of rolling elements with respect to the inner ring and/or the outer ring and consequently the contact angle (α) of a rolling element bearing using just one measurement station if the distance of the P−1 or fewer of the plurality, P of rolling elements from that measurement station is known.

The invention claimed is:

1. A method for determining a contact angle (a) of a rolling element within a roller bearing, the method comprising the steps of;
  providing an inner ring, an outer ring and a plurality, P, of rolling elements disposed between the inner ring and the outer ring, the outer ring comprising an outer raceway thereon,
  rotating at least one of the inner ring and the outer ring,
  using pulse generating means to generate pulses when at least one of the plurality, P, of rolling elements passes a first measuring station, the pulse generating means generating pulses at a rate of between two-thousand (2000) and three-thousand (3000) pulses per revolution of the at least one of the plurality of rolling elements,
  counting pulses generated to determine the time taken for the at least one of the plurality, P, of rolling elements to move between the first measuring station and a second measuring station, wherein the first measuring station and the second measuring station are located around a circumference of the roller bearing, and wherein the first measuring station is located at an angular distance of 10-70° (ten to seventy degrees) from the second measuring station, and
  determining the relative speed of the at least one of the plurality, P, of rolling elements with respect to the one of the inner ring and the outer ring that is rotating and determining the contact angle (a) of the rolling element therefrom, the contact angle being the angle between a first line extending perpendicular to and through an axis of rotation of the roller bearing and extending through a center of the at least one of the plurality, P, of rolling elements and a second line extending through a point on the outer raceway that the at least one of the plurality, P, of rolling elements applies pressure on and the center of the at least one of the plurality, P, of rolling elements.

2. The method according to claim 1, further comprising the step of determining the relative speed of only the one of the plurality, P, of rolling elements with respect to the one of the inner ring and the outer ring that is rotating and determining the contact angle (a) therefrom.

3. The method according to claim 1, further comprising the step of
  stopping counting pulses when the at least one of the plurality, P, of rolling elements pass/passes said second measuring station.

4. The method according to claim 1, further comprising the steps of determining the relative speed of the at least one of the plurality, P, of rolling elements with respect to the one of the inner ring and the outer ring that is rotating and
  determining the contact angle (a) as the one of the outer ring or the inner ring rotates through less than one revolution.

5. The method according to claim 1, further comprising the step of determining the contact angle (a) of the rolling element within one of a ball bearing, a four-point contact ball bearing, a roller bearing, a needle bearing, and a spherical roller bearing.

6. The method according to claim 1, wherein the first measuring station is located at an angular distance of 10-30° from the second measuring station.

7. A computer program product stored on a non-transitory computer readable medium, comprising:
  a computer program containing computer program code means arranged to cause a computer or a processor to execute the steps of,
  providing a roller bearing comprising an inner ring, an outer ring having an outer raceway thereon and a plurality, P, of rolling elements disposed between the inner ring and the outer ring, and
  providing a first measuring station and a second measuring station configured to determine the time taken for at least one of the plurality, P, of rolling elements to move between the first measuring station and the second measuring station, wherein the first measuring station and the second measuring station are located around a circumference of the roller bearing, wherein the first measuring station is located at an angular distance of 10-70° (ten to seventy degrees) from the second measuring station,
  using pulse generating means to generate pulses when the at least one of the plurality, P, of rolling elements passes the first measuring station, the pulse generating means generating pulses at a rate of between two-thousand (2000) and three-thousand (3000) pulses per revolution of the at least one of the plurality of rolling elements, counting pulses generated to determine the time taken for the at least one of the plurality, P, of rolling elements to move between the first measuring station and the second measuring station, determining the relative speed of the at least one of the plurality, P, of rolling elements with respect to the inner ring and/or the outer ring and determining a contact angle (a) of the at least one of the plurality, P, of rolling elements therefrom, the contact angle being the angle between a first line extending perpendicular to and through an axis of rotation of the roller bearing and extending through a center of the at least one of the plurality, P, of rolling elements and a second line extending through a point on the outer raceway that the at least one of the plurality, P, of rolling elements applies pressure on and the center of the at least one of the plurality, P, of rolling elements, determining the relative speed of the at least one of the plurality, P, of rolling elements before the at least one of the plurality, P, of rolling elements rotates 60° (sixty degrees) about the circumference of the roller bearing.

8. A device for determining a contact angle (a) of a rolling element within a roller bearing comprising an inner ring, an outer ring having an outer raceway thereon and a plurality, P, of rolling elements disposed between the inner ring and the outer ring, the device comprising:

a first measuring station and a second measuring station configured to determine the time taken for at least one of the plurality, P, of rolling elements to move between the first measuring station and the second measuring station, wherein the first measuring station and the second measuring station are located around a circumference of the roller bearing, wherein the first measuring station is located at an angular distance of 10-70° (ten to seventy degrees) from the second measuring station, pulse generating means to generate pulses when the at least one of the plurality, P, of rolling elements passes the first measuring station, the pulse generating means generating pulses at a rate of between two-thousand (2000) and three-thousand (3000) pulses per revolution of the at least one of the plurality of rolling elements, the device configured to count pulses generated to determine the time taken for the at least one of the plurality, P, of rolling elements to move between the first measuring station and the second measuring station, wherein the device is arranged to determine the relative speed of the at least one of the plurality, P, of rolling elements with respect to the inner ring and/or the outer ring and determine the contact angle (a) of the one of the plurality, P, of rolling elements therefrom, the contact angle being the angle between a first line extending perpendicular to and through an axis of rotation of the roller bearing and extending through a center of the at least one of the plurality, P, of rolling elements and a second line extending through a point on the outer raceway that the at least one of the plurality, P, of rolling elements applies pressure on and the center of the at least one of the plurality, P, of rolling elements.

9. The device according to claim 8, further comprising being designed to determine the relative speed of only the one of the plurality, P, of rolling elements with respect to the inner ring and/or the outer ring and determine the contact angle (a) therefrom.

10. The device according to claim 8, wherein the device is configured to stop counting pulses when the at least one of the plurality, P, of rolling elements pass/passes said second measuring station.

11. The device according to claim 8, further comprising being designed to determine the relative speed of the at least one of the plurality, P, of rolling elements with respect to the inner ring and/or the outer ring and the contact angle (a) as the outer ring or the inner ring rotates through less than one revolution.

12. The device according to claim 8, further comprising being designed to determine the contact angle (a) of the at least one of the plurality, P, of rolling elements within one of a ball bearing, a four-point contact ball bearing, a roller bearing, a needle bearing, and a spherical roller bearing.

13. The device according to claim 8, further comprising the first measuring station located at an angular distance of 10-30° from the second measuring station.

* * * * *